United States Patent [19]
Bertelo et al.

[11] Patent Number: 5,693,699
[45] Date of Patent: Dec. 2, 1997

[54] REINFORCING COMPOSITIONS FOR THERMOPLASTIC POLYMERS, INCLUDING A SYNERGIC COMBINATION OF MICRONIZED SILICA AND OF CALCIUM SALT WHICH HAVE IMPROVED ANTICAKING AND FLOW PROPERTIES

[75] Inventors: Chris Bertelo, Scotch Plains, N.J.; Paul Kunesch, Ousse; Gilles Meunier, Mazerolles, both of France

[73] Assignee: Elf Atochem North America Inc., Philadelphia, Pa.

[21] Appl. No.: 539,636

[22] Filed: Oct. 5, 1995

[30] Foreign Application Priority Data

Oct. 5, 1994 [FR] France .................. 94 11897

[51] Int. Cl.⁶ .................. C08J 5/10; C08K 5/04; C08K 5/09; C08L 27/06
[52] U.S. Cl. .................. 524/400; 524/492; 524/493; 524/424; 524/450; 524/436; 524/425
[58] Field of Search .................. 524/425, 492, 524/493, 424, 450, 436

[56] References Cited

U.S. PATENT DOCUMENTS

| | | | |
|---|---|---|---|
| 3,883,489 | 5/1975 | Matschke et al. | 260/78.5 R |
| 3,996,173 | 12/1976 | Heichele et al. | 260/23 XA |

*Primary Examiner*—Paul R. Michl
*Assistant Examiner*—U. K. Rajguru
*Attorney, Agent, or Firm*—Millen, White, Zelano, & Branigan, P.C.

[57] ABSTRACT

The invention relates to reinforcing compositions for thermoplastic polymers which have improved anticaking and flow properties, which include an impact additive and a synergic combination including a micronized silica and at least one calcium salt.

These compositions are very particularly suitable for the reinforcement of PVC.

21 Claims, 1 Drawing Sheet

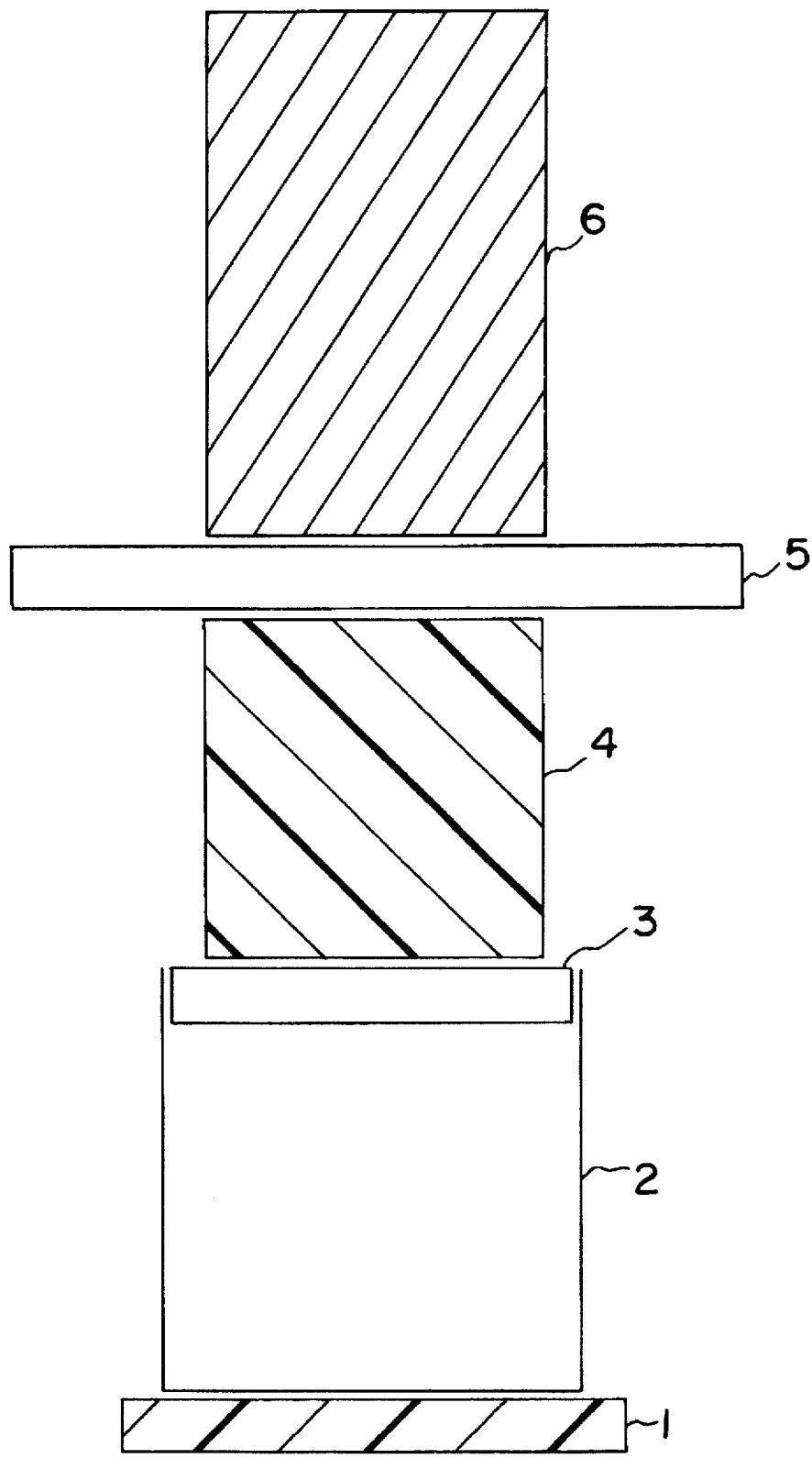
F I G. I

REINFORCING COMPOSITIONS FOR THERMOPLASTIC POLYMERS, INCLUDING A SYNERGIC COMBINATION OF MICRONIZED SILICA AND OF CALCIUM SALT WHICH HAVE IMPROVED ANTICAKING AND FLOW PROPERTIES

CROSS-REFERENCE TO RELATED APPLICATION

This application is related to a concurrently filed application entitled "REINFORCING COMPOSITIONS INCLUDING A PRECIPITATED SILICA FOR THERMOPLASTIC POLYMERS WHICH HAVE IMPROVED ANTICAKING AND FLOW PROPERTIES", Attorney's Docket No. ATOCM 53, by the same inventors, based on French priority application Ser. No. 94/11898.

BACKGROUND OF THE INVENTION

The invention relates to a reinforcing composition for thermoplastic polymers which have improved anticaking and flow properties, including at least two inert fillers.

The invention relates especially to a reinforcing composition for vinyl chloride polymers, it being possible for said composition to include a copolymer derived from butadiene and/or from an acrylic ester and a "synergic" combination of $CaCO_3$ and of micronized silica.

Some synthetic resins, especially resins based on polyvinyl chloride or on a copolymer with a predominant content of vinyl chloride are widely employed in the building industry especially because of their low price and their good physical and/or chemical properties.

Nevertheless they exhibit low impact strength at ambient temperature or at low temperature or, also, after aging.

It has been proposed to overcome these defects by incorporating into these thermoplastic resins products which are called impact additives, which are generally polymers exhibiting some elastomeric character.

The weight quantity of elastomer in these impact additives may vary to a wide extent. It generally ranges from 40 to 70%. However, if it is desired to increase this weight content of elastomer in the impact additive, in order thereby to improve its effectiveness, considerable caking is found when said additive is isolated in the form of powder and, also, during storage.

This gives rise to difficulties in handling and rules out conveying the additives pneumatically.

In U.S. Pat. No. 4,278,576 there is a description of a process for isolating an impact additive in powder form, which makes it possible to reduce the caking of an impact additive of the "polymer grafted MBS" type, or else of core/shell acrylic type polymers.

This process, which enables the impact additive polymer to be isolated in the form of a powder which has improved flow and anticaking properties, includes the introduction of approximately 0.5 to 50% by weight, based on the mixture, of a stearate-coated calcium carbonate which has a mean particle diameter ranging from 0.04 to 1 micron, after the formation of said polymer but before or during the isolation of the powders.

In U.S. Pat. No. 3,985,703 there is also a description of a process which makes it possible to obtain core/shell acrylic polymer powders that have elastomeric portion contents ranging from 55 to 85%, which have improved flow and anticaking properties.

This process consists in adding 0.01 to 1.5% of inert particles of micronized silica with a particle diameter of 0.012 microns, especially at the time of the spray-drying of the said powders.

SUMMARY OF THE INVENTION

A reinforcing composition for a thermoplastic polymer has now been found, including at least one impact additive, which has improved anticaking and flowability properties and which is characterized in that it additionally includes a synergic combination of at least two inert fillers.

According to the present invention the synergic combination includes a micronized silica and at least one calcium salt chosen from calcium carbonate, calcium stearate and calcium hydroxyaluminate $Ca_6Al(OH)_{15}$. According to the present invention the calcium carbonate is preferably coated with a calcium salt of a higher fatty acid containing at least 12 carbon atoms. Stearic acid forms the preferred fatty acid. The coating of the calcium salt is performed in a conventional manner by mixing fatty acids and particles of calcium carbonate, preferably at temperatures of between 60° and approximately 200° C., so as to make the fatty acid react with the surface of the calcium carbonate in order to form an adherent coating of the calcium salt on the carbonate particles.

This coating practically covers the individual particles, although in some cases part of the fatty acid may also be present at the surface of the carbonate particles.

According to the invention, the calcium salt particles have a mean diameter ranging from 0.04 to 10 microns and preferably from 0.5 to 2 microns.

The calcium carbonate particles have a mean diameter ranging from 1 to 1.5 microns.

Such coated calcium carbonates can be obtained under the names Omyalite 90T and 95T which are marketed by the Omya Company.

According to the present invention it is preferred to employ Omyalite 95T, which has particles with a mean diameter of approximately 1.5 microns.

According to the present invention the micronized silica has an $SiO_2$ content of at least 99.5% and particles with a mean diameter smaller than 0.02 microns and preferably ranging from 0.010 to 0.015 microns. It has a specific surface of between 150 and 250 $m^2/g$ and preferably between 175 and 225 $m^2/g$.

Such silicas can be obtained under the names Cabosil M5, Aerosil R805 and Aerosil R972.

According to the present invention the weight proportions of micronized silica and of calcium salt may vary to a wide extent. However, the synergic effect of the micronized silica/calcium salt combination is exhibited very particularly when the calcium salt/micronized silica weight ratio is between 95/5 and 70/30 and, preferably, between 90/10 and 85/15.

By way of illustration of the impact additives that can be employed according to the present invention, there may be mentioned in particular the graft copolymers derived from a conjugated diene such as butadiene or isoprene, which are chosen from butadiene-styrene thermoplastic resins such as the acrylonitrile-butadiene-styrene resins (ABS resins), the methacrylic alkyl ester-butadiene-styrene resins (MBS resins) and the acrylic and/or methacrylic alkyl ester-butadiene-styrene resins. Among the methacrylic alkyl ester resins there may be mentioned in particular the methyl methacrylate-butadiene-styrene resins, the ethyl methacrylate-butadiene-styrene resins, the butyl methacrylate-butadiene-styrene resins and the lauryl methacrylate-butadiene-styrene resins. With regard to the acrylic alkyl ester-butadiene-styrene resins, there may be mentioned those derived from methyl, ethyl, butyl or 2-ethylhexyl acrylates. Mention may also be made of the graft copolymers including a backbone consisting of a random copolymer of a conjugated diene and of a $C_2$–$C_{12}$ alkyl acrylate onto which are grafted chains of a copolymer of $C_1$–$C_4$ alkyl methacrylate and of $C_1$–$C_8$ alkyl acrylate, it being additionally possible for the backbone copolymer to contain units derived from a crosslinking agent containing at least two $CH_2$=C< groups, said copolymers having been described, for example, in French Patents 2 551 446 and 2 551 447, the content of which is incorporated by reference.

It is also possible to employ resins derived from butadiene which are thermoplastic during the processing and before vulcanization, such as styrene-butadiene rubber (SBR), nitrile-butadiene rubber (NBR) and acrylate-butadiene rubber (ABR).

Among these polymers derived from butadiene preference is given to the MBS and ABS resins.

It is also possible to employ essentially acrylic resins, that is to say those containing more than 90% by weight of polymerized acrylic ester.

According to the present invention the elastomer content in the polymeric impact additive is at least 60% by weight and preferably between 70% and 90%.

The reinforcing composition according to the present invention includes at least 80% by weight of impact additive from 95% to 99%, and not more than 20% by weight of the synergic combination, preferably, 1% to 5%.

The thermoplastic polymer into which the reinforcing composition in accordance with the invention may be incorporated with a view to improving its impact strength may especially consist of polymer of the type of polycondensates, especially polyesters such as polybutylene terephthalate, polycarbonates, polyamides, or else of the type of polymers such as, for example, polymethacrylates and especially polymethyl methacrylate. The thermoplastic polymer may also consist of one or more addition polymers chosen from the group made up of vinyl chloride homopolymers which may be optionally overchlorinated, and copolymers which result from the copolymerization of vinyl chloride with one or more ethylenically unsaturated comonomers and which contain at least 80% by weight of polymerized vinyl chloride. Comonomers that are especially suitable for the preparation of such copolymers are vinylidene halides such as vinylidene chloride or fluoride, vinyl carboxylates such as vinyl acetate, vinyl propionate and vinyl butyrate, acrylic and methacrylic acids and the nitriles, amides and alkyl esters which are derived therefrom, especially acrylonitrile, acrylamide, methacrylamide, methyl methacrylate, methyl acrylate, butyl acrylate, ethyl acrylate, 2-ethylhexyl acrylate, vinylaromatic derivatives such as styrene and vinylnaphthalene, and olefins such as bicyclo [2.2.1]-2-heptene, bicyclo[2.2.1]hepta-2,5-diene, ethylene, propene and 1-butene.

Among these polymers, the invention is concerned very particularly with vinyl chloride homo- and copolymers.

The reinforcing composition of the present invention is employed in a proportion of 1 to 15 parts per 100 parts by weight of thermoplastic polymer and, preferably, from 4 to 9 parts.

The invention is also concerned with the compositions including the thermoplastic polymer and the reinforcing composition such as those defined above.

It is also concerned with such compositions containing in addition, and especially as a function of the processing or conversion conditions and/or of the applications for which they are destined, the usual additives such as pigments and/or fillers, plasticizers, antioxidants and light- or ultraviolet stabilizers.

By way of illustration of these additives there may be mentioned β-diketones, hydrotalcites, dihydropyridines, carboxylic acid salts of metals such as Li, Na, K, Mg, Ca, Sr, Ba, Pb, Zn, Cd, Zr, Al, Si, Sb, and Bi or of pairs of these metals, such as Ca/Zn, Ba/Ca, Ca/Cd or Ba/Zn; mercaptides and especially tin mercaptides, alkyl or aryl phosphites, epoxy compounds, polyols, internal or external lubricants such as ester waxes, fatty acid esters, oxidized or unoxidized polyethylene waxes, hydrogenated castor oil, glycerol monooleate or stearate, montanic acid esters and fillers such as titanium dioxide or calcium carbonate.

Except for the plasticizers, which may generally be employed in ratios that can reach 100% of the weight of the thermoplastic polymer, the other abovementioned additives may be employed in ratios that may represent 0.05 to 20% of the weight of the thermoplastic polymer.

The reinforcing composition according to the present invention may be prepared merely by dry-mixing the constituents of the composition in an apparatus which ensures good dispersion of powders of small particle size. Cloup type mixers, which rotate at a speed of at least 5000 rev/min and preferably between 7000 and 10,000 rev/min may be employed for this purpose.

It is also possible to prepare a mixture of the constituents of the synergic combination and then to introduce the impact additive(s) into the mixture obtained.

The impact additive and the synergic combination may be incorporated as a mixture (reinforcing composition) or as they are into the thermoplastic polymer before, at the same time as, or after the other additives referred to above when these are being used.

The synergic mixture may also be introduced at the time of the drying of the impact additive, which may be performed especially by spraying. The examples which follow illustrate the invention.

BRIEF DESCRIPTION OF DRAWING

FIG. 1 is a schematic elevation of a device used to test the caking characteristics of the products of the invention.

PREPARATION OF THE REINFORCING COMPOSITIONS ACCORDING TO THE INVENTION

The compositions were prepared with the following constituents:

Impact Additive A1

The impact additive of the core/shell type (80/20) is prepared according to the technique described in U.S. Pat. No. 4,278,576, which employs a standard emulsion polymerization technique, namely the core/shell acrylic polymer is prepared by employing 79.2 parts of butyl acrylate, 0.4 parts of butylene glycol diacrylate and 0.4 parts of diallyl maleate as elastomeric core, followed by a polymerization of 20 parts of methyl methacrylate.

The powder is obtained from the emulsion by spray drying.

The water content of the additive is 1%.

Impact Additive A2

Methyl methacrylate/butadiene/styrene which has 70% of elastomeric phase consisting solely of butadiene sold under the name Metablen-C 323 by the company Metablen B.V.

CaCO$_3$

Coated CaCO$_3$ of Omyalite 95 T type, referred to below as 95 T CaCO$_3$.

Micronized Silica

Micronized silica of Cabosil M5 type, which has a diameter of 0.012 microns, an SiO$_2$ content>99.8% and a specific surface of 200 m$^2$/g.

Calcium Stearate (CaSt. Below) Stavinor CAP SE

The reinforcing compositions are produced by dry mixing of the various constituents at ambient temperature in a mixer of the "Cloup" type rotating at 7000 rev/min.

The following are performed on the mixture obtained:
the caking test
the test for ability to flow, referred to as flowability below.

Caking Test

This is performed with a device as shown in FIG. 1.

A hollow cylinder (2) 50 mm in height and with an internal diameter of 55 mm is deposited on a 60 ×60 mm PVC plaque (1) 7 mm in thickness.

20 g of powder are introduced into the cylinder (2), the surface is flattened and a disc (3) 55 mm in diameter and 10 mm in thickness is applied. Onto this disc is applied a solid PVC cylinder (4) 50 mm in diameter and 40 mm in height and then an 85 ×85 mm plaque (5) 6 mm in thickness.

The whole is introduced into an oven at 45° C. and a 5-kg weight (6) is deposited on the plaque (5).

These are kept at 45° C. for 2 hours.

After 2 hours the 5-kg weight, the plaque (5) and the solid cylinder (4) are removed.

The material is again kept in the oven at 45° C. for 30 minutes and the sample of compacted powder is allowed to cool at ambient temperature for 30 minutes.

The powder in the form of a compacted tablet is introduced into a 12-mesh screen (mesh opening=1.40 mm) of a Prolabo type screening unit, which is set to vibrate (setting 5.5).

The remaining weight is read every 5 seconds and so is the time after which 60% of the product has passed through. The results are expressed in seconds:
the longer the time for 60% of the product to pass through, the greater the caking.

The test for ability to flow or flowability is performed according to the ISO International Standard 6186-1980 (F).

The results are expressed in seconds. The longer the time, the poorer the ability to flow.

The results of the tests for caking and for ability to flow, performed on reinforcing compositions based on the impact additives A1 or A2, of the 95T CaCO$_3$/silica or calcium stearate/silica synergic combination are reported in Table 1.

In this table the proportions of the constituents in the reinforcing composition are expressed as a percentage by weight.

Examples 4, 5, 6, 8, 12 and 13 are according to the invention. It can be seen that the CaCO$_3$/SiO$_2$ or calcium stearate/SiO$_2$ synergic compositions improve the anticaking and flowability properties of the reinforcing compositions of the present invention. For example, in the case of a composition containing 2.55% of CaCO$_3$ and 0.45% of silica the product flows and there is a caking equal to 8 seconds (Example 6), whereas with 3% of CaCO$_3$ there is a caking equal to 24 seconds and the product flows intermittently (Example 2, not in accordance with the invention).

TABLE 1

| EXAMPLES | IMPACT ADDITIVE (%) A1 | IMPACT ADDITIVE (%) A2 | 95T CaCO$_3$ (%) | SiO$_2$ (%) | CaCO$_3$ SiO$_2$ | CaSt. (%) | CaSt. SiO$_2$ | Caking (seconds) | Flowability (seconds) |
|---|---|---|---|---|---|---|---|---|---|
| 1 | 100 | | | | | | | 50 | Does not flow |
| 2 | 97 | | 3 | | | | | 24 | 10 I |
| 3 | 99.7 | | 0.3 | | | | | 29 | 10 F |
| 4 | 97 | | 2.85 | 0.15 | 95/5 | | | 16 | 10 F |
| 5 | 97 | | 2.70 | 0.30 | 90/10 | | | 8 | 10.5 F |
| 6 | 97 | | 2.55 | 0.45 | 85/15 | | | 8 | 10.5 F |
| 7 | 96 | | 4 | | | | | 18 | 11 F |
| 8 | 96 | | 3.6 | 0.40 | 90/10 | | | 5 | 13 F |
| 9 | 97 | | | | | 3 | | 18 | 12.5 I |
| 10 | 97 | | | 0.30 | | 2.7 | 90/10 | 15 | 10 F |
| 11 | | 100 | | | | | | 50 | 10 F |
| 12 | | 98 | 1.8 | 0.20 | 90/10 | | | 6 | 8.5 F |
| 13 | | 97 | 2.70 | 0.30 | 90/10 | | | <5 | 8.5 F |

I = flows intermittently; F = flows

EVALUATION OF THE IMPACT STRENGTH OF THE COMPOSITIONS ACCORDING TO THE INVENTION

A composition containing the following (parts by weight) is prepared at 25° C.:

100 parts of a vinyl chloride homopolymer of K value=67,
2.5 parts of lead phosphite,
1.5 parts of calcium stearate,
6 parts of calcium carbonate,
4 parts of TiO$_2$,
1 part of a processing aid (Metablen P550 marketed by the company Metablen B.V.),
0.2 parts of 12 stearic acid,
0.3 parts of Loxiol G60 (internal lubricant),
4 parts of polyethylene waxes (external lubricant) and 9 parts of the reinforcing composition of Example 2, not in accordance with the invention [→ Example 14, Table 2] or 9 parts of the reinforcing composition of Example 5 in accordance with the invention [→ Example 15, Table 2].

Test pieces are produced from the PVC compositions obtained previously in order to perform tests for determining the notched Charpy impact strength characteristics according to Standard BS:2782.

To prepare the test pieces for the Charpy impact tests the PVC resin compositions resulting from the mixing of the abovementioned ingredients are calendered at 175° C. for 6 minutes on a calender of the Schwaribenthan type, and are then moulded at 190° C. on a Derragon press for 5 minutes at a pressure of 200 bars, in the form of plaques, the cooling of the said plaques taking place in the press.

The test pieces are cut out by means of a circular saw and then of a cutter for the Charpy impact tests.

The thickness of the test pieces, the shape of which is that specified by the abovementioned standard, is 2.5 mm.

The results are reported in Table 2.

TABLE 2

| EXAMPLES | Break energy (in kJ/m²) | % OF BREAKAGE |
| --- | --- | --- |
| 14 (control) | 16.6 | 0 |
| 15 | 16.2 | 0 |

It may be concluded that the impact strength of the PVC composition is virtually not modified by the addition of the $CaCO_3/SiO_2$ synergic combination (Example 15).

The preceding examples can be repeated with similar success by substituting the generically or specifically described reactants and/or operating conditions of this invention for those used in the preceding examples.

The entire disclosures of all applications, patents and publications, cited above and below, and of corresponding French application 94/11897, are hereby incorporated by reference.

From the foregoing description, one skilled in the art can easily ascertain the essential characteristics of this invention, and without departing from the spirit and scope thereof, can make various changes and modifications of the invention to adapt it to various usages and conditions.

We claim:

1. A reinforcing composition suitable for thermoplastic polymers, said composition comprising at least one polymeric impact additive, and a synergic combination including a micronized silica and at least one calcium salt selected from the group consisting of calcium carbonate, calcium stearate and calcium hydroaluminate $Ca_6Al(OH)_{15}$, wherein the synergic combination imparts to the composition improved flowability and anti-caking properties compared to a combination of the impact additive with either the micronized silica or the at least one calcium salt alone.

2. A composition according to claim 1, wherein the calcium salt is carbonate coated with a calcium salt of a fatty acid containing at least 12 carbon atoms.

3. A composition according to claim 2, wherein the fatty acid is stearic acid.

4. A composition according to claim 1, wherein the calcium salt has particles of a mean diameter ranging from 0.04 to 10 microns.

5. A composition according to claim 1, wherein the calcium salt is calcium carbonate having particles with a mean diameter ranging from 1 to 1.5 microns.

6. A composition according to claim 1, wherein the micronized silica has particles with a mean diameter smaller than 0.02 microns.

7. A composition according to claim 5, wherein the micronized silica has particles with a mean diameter ranging from 0.010 to 0.015 microns.

8. A composition according to claim 1, wherein the calcium salt/micronized silica weight ratio of the synergic combination is between 95/5 and 70/30.

9. A composition according to claim 7, wherein the calcium salt/micronized silica weight ratio is between 90/10 and 85/15.

10. A composition according to claim 1, wherein the impact additive is a methacrylic alkyl ester-butadiene-styrene (MBS) resin or an acrylic resin containing more than 90% by weight of polymerized acrylic ester.

11. A composition according to claim 1, comprising at least 80% by weight of said impact additive and not more than 20% by weight of the synergic combination.

12. A composition according to claim 11, comprising from 95% to 99% by weight of impact additive and from 1% to 5% by weight of the synergic combination.

13. A thermoplastic polymer composition containing a reinforcing composition according to claim 1.

14. A thermoplastic polymer composition according to claim 13, in which the thermoplastic polymer is a vinyl chloride homo- or copolymer.

15. A composition according to claim 9, wherein the impact additive is a methacrylic alkyl ester-butadiene-styrene (MBS) resin or an acrylic resin containing more than 90% by weight of polymerized acrylic ester.

16. A composition according to claim 12, wherein the impact additive is a methacrylic alkyl ester-butadiene-styrene (MBS) resin or an acrylic resin containing more than 90% by weight of polymerized acrylic ester.

17. A thermoplastic polymer composition containing a reinforcing composition according to claim 10.

18. A thermoplastic polymer composition according to claim 17, in which the thermoplastic polymer is a vinyl chloride homo- or copolymer.

19. A thermoplastic polymer composition containing a reinforcing composition according to claim 15.

20. A thermoplastic polymer composition according to claim 19, in which the thermoplastic polymer is a vinyl chloride homo- or copolymer.

21. The composition of claim 1, wherein the impact additive is a butadiene-styrene thermoplastic resin, a graft copolymer consisting essentially of a backbone consisting of a random copolymer of a conjugated diene and a $C_2$—$C_{12}$ alkyl acrylate onto which is grafted chains of a copolymer of $C_1$-$C_4$ alkyl methacrylate and $C_1$-$C_8$ alkyl acrylate, styrene-butadiene rubber, nitrile-butadiene rubber, acrylate-butadiene rubber, an acrylic resin or mixtures thereof.

* * * * *